United States Patent
Scholz et al.

(10) Patent No.: US 6,929,319 B2
(45) Date of Patent: Aug. 16, 2005

(54) LOCK FOR A REMOVABLE ROOF

(75) Inventors: Andre Scholz, Wiernsheim (DE); Reiner Armbruster, Muehlacker (DE); Wolfgang Braun, Ebersbach (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/787,250

(22) Filed: Feb. 27, 2004

(65) Prior Publication Data

US 2004/0232735 A1 Nov. 25, 2004

(30) Foreign Application Priority Data

Feb. 28, 2003 (DE) .......................................... 103 08 770

(51) Int. Cl.[7] ................................ B60J 7/19; B60J 7/11
(52) U.S. Cl. .................... 296/218; 296/224; 292/336.6; 292/DIG. 5
(58) Field of Search ................................ 296/218, 224; 292/336.3, DIG. 4

(56) References Cited

U.S. PATENT DOCUMENTS

| | | | | |
|---|---|---|---|---|
| 4,195,866 A | * | 4/1980 | Tundo et al. ............... | 292/127 |
| 4,482,179 A | * | 11/1984 | Johnson .................... | 292/336.3 |
| 4,664,436 A | | 5/1987 | Eyb | |
| 5,957,511 A | * | 9/1999 | Homann et al. ............ | 292/196 |

FOREIGN PATENT DOCUMENTS

| | | |
|---|---|---|
| DE | 3413379 C2 | 2/1986 |
| EP | 0863032 B1 | 6/2002 |

* cited by examiner

*Primary Examiner*—Dennis H. Pedder
(74) *Attorney, Agent, or Firm*—Crowell Moring LLP

(57) ABSTRACT

A lock suited for a removable roof of a motor vehicle, especially a passenger car, is held against a fixed structural part such as a rollover bar of a body of the motor vehicle by way of a locking member of the lock. The lock has a first actuating element and a second actuating element, and the first actuating element is surrounded by the second actuating element surface-flush. The actuating elements act in conjunction with each other such that only upon operating the first actuating element can the second actuating element be moved from a closed position into an open position. To ensure that the lock has a simple design and good functionality while requiring little space, the first actuating element effects the open position of the lock with a lifting motion and the second actuating element with a rotary motion. The locking member of the lock is connected torsion-resistant by way of a bearing shaft to the second actuating element.

16 Claims, 5 Drawing Sheets

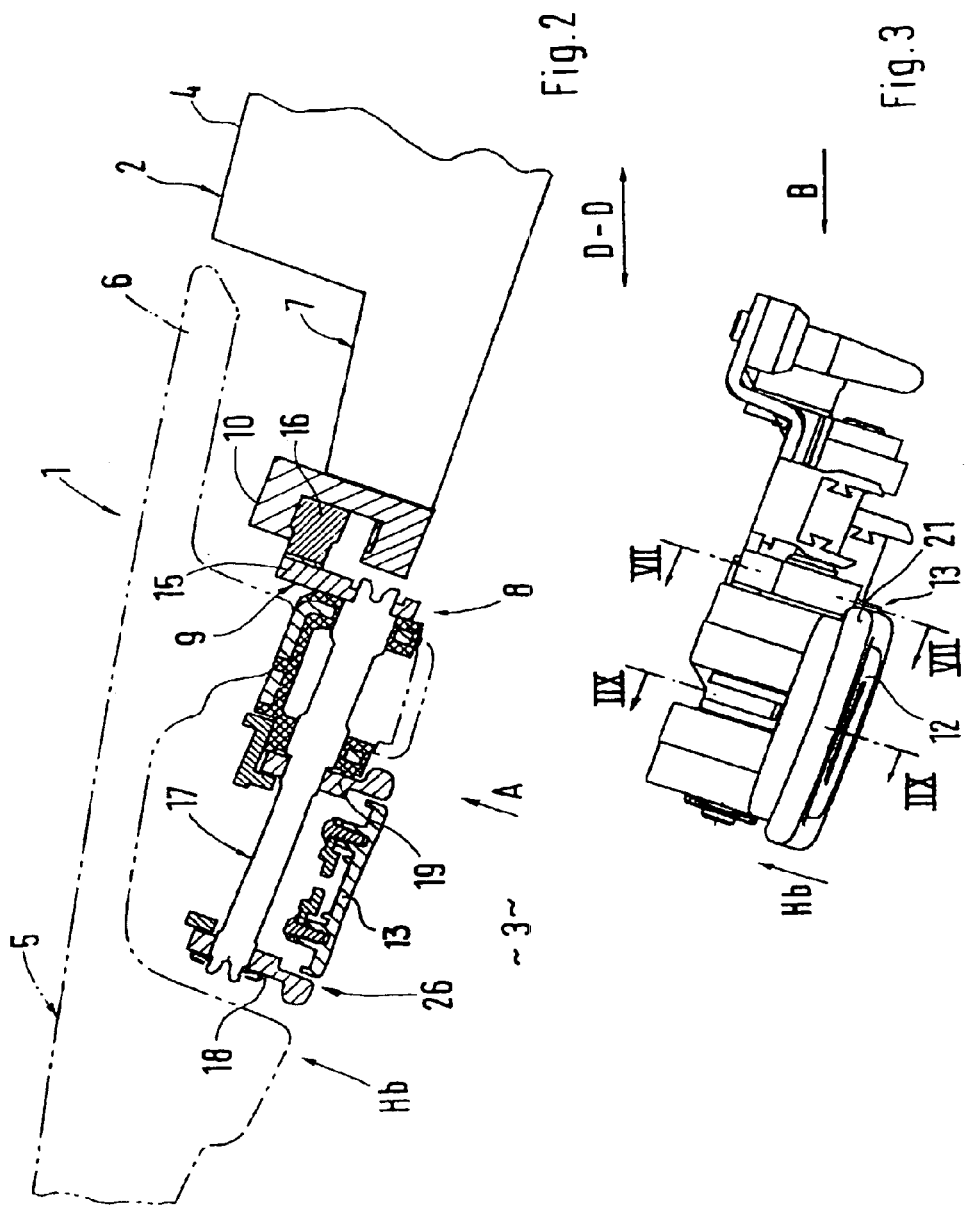

ABSTRACT

LOCK FOR A REMOVABLE ROOF

This application claims the priority of German application 103 08 770.2, filed Feb. 28, 2003, the disclosure of which is expressly incorporated by reference herein.

Cross-references to commonly assigned U.S. patent application serial NOs. 10/787,249, titled REMOVABLE ROOF FOR A MOTOR VEHICLE, filed Feb. 27, 2004, 10/788,252, titled REMOVABLE ROOF FOR A MOTOR VEHICLE, filed Feb. 27, 2004, and 10/788,251, titled LOCKING DEVICE FOR A REMOVABLE TOP, filed Feb. 27, 2004, are hereby made.

The present invention relates to a lock for a removable roof of a motor vehicle, particularly a passenger car, including a locking member by which the roof is held against a fixed structural part of a body of the motor vehicle, a first actuating element, and a second actuating element, and in which the first actuating element is surrounded by the second actuating element surface-flush, the actuating elements acting in conjunction with each other such that only upon operating the first actuating element can the second actuating element be moved from a closed position into an open position.

A lock of the above-mentioned kind, known from European publication EP 0 863 032 B1, is provided between a forward cross-frame of a roof and an upper transverse section of a windshield frame. The lock keeps the cross-frame on the transverse section in position under tension in the closed roof position and comprises a first actuating component and a second actuating component. The actuating components are formed by one-armed levers. Here the second actuating component surrounds the first actuating component surface flush. Additionally the two actuating components work in conjunction with each other such that only upon actuation of the first actuating component can the second actuating component be moved into an unlocked position.

German publication DE 34 13 379 C2 reveals a locking device for a roof on the windshield frame of a motor vehicle, which acts together with a mounting on the windshield frame by means of a locking member on a cover frame. The locking member comprises a crank with a locking bolt, which engages a slotted link of the mounting. It is one object of the invention to create a lock for a removable roof which is characterized by a simple design and good functionality while requiring little space.

Pursuant to the invention, this object is achieved by effecting the open position via a lifting motion of the first actuating element and a rotary motion of the second actuating element, and by having the locking member of the lock connected torsion-resistant by way of a bearing shaft to the second actuating element. Additional features characterizing the invention are included in dependent claims. A process of operating the lock is also claimed.

Advantages achieved with the invention include that the first actuating element is designed so as to perform vertical motions and the second actuating element is designed so as to perform rotary motions, thus achieving beneficial spatial conditions. The latter is also supported by connecting the bearing shaft of the locking member with the second actuating element. Owing to this construction, structural complexity is also kept low, and the lock operates as required for its function. The latching device and the spring ensure that the second actuating element is kept first in a closed position and then in an open position. Finally, the guide apparatus supports a good interaction of the actuating elements of the lock system.

BRIEF DESCRIPTION OF THE DRAWINGS

The drawings show an exemplary embodiment of the invention, which is explained in more detail in the following.

FIG. 2 illustrates a longitudinal sectional view through the removable roof of a motor vehicle with the lock of the invention taken along section lines II—II of FIG. 1, FIG. 3 illustrates a side view of the lock in the installation position.

DETAILED DESCRIPTION OF THE INVENTION

Figure 1:
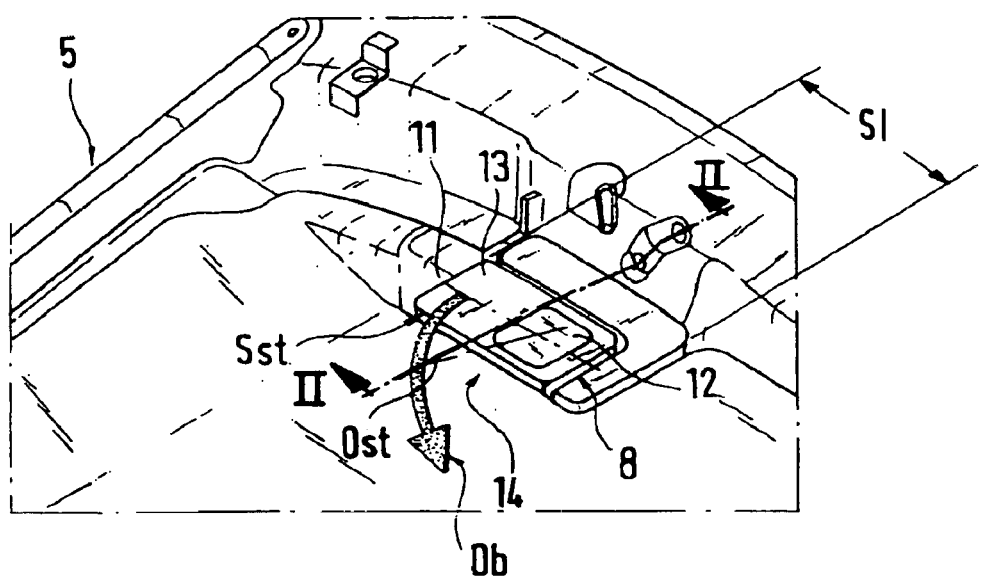
FIG. 1 illustrates a three-quarters view of a removable roof with the lock of the invention.
Figure 4:
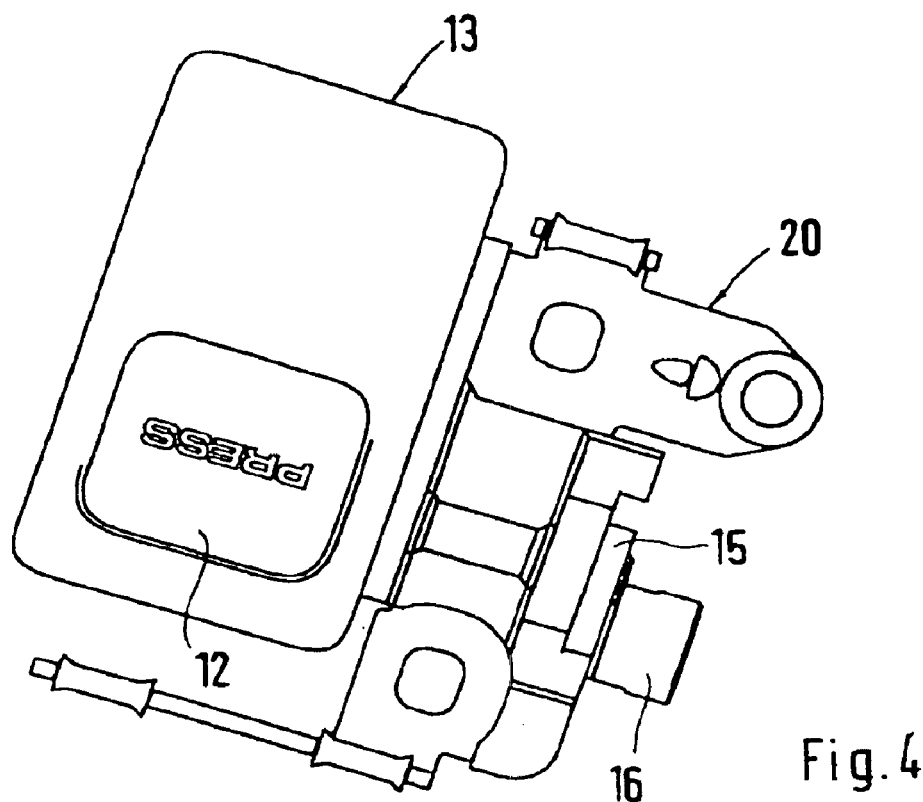
FIG. 4 is a view in the direction of the arrow A of FIG. 2.
Figure 5:
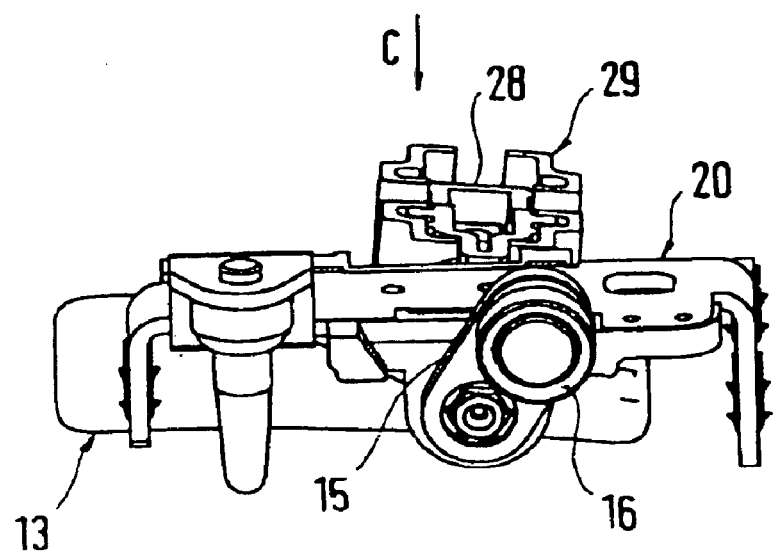
FIG. 5 is a view in the direction of the arrow B of FIG. 3.

From a passenger car 1, for example of the sports car type, only a partial area of a body 2 is shown, which comprises a fixed structural part in the form of a rollover bar 4 extending across a passenger compartment 3 that stretches crosswise to the vehicle longitudinal direction D—D. A removable roof 5 made of dimensionally stable plastic, for example, which is connected to a rear roof wall 6 of a step 7 of the rollover bar 4 accommodating a sealing element, is joined to the rollover bar 4. The roof 5 is held on the rollover bar 4 by means of a lock 8, wherein the lock 8 that is attached to the roof 5 engages a mounting 10 of the rollover bar 4 by means of a locking member 9—FIG. 2. A locking member and a mounting of this kind are described in detail in German publication DE 34 13 379 C2 mentioned above.

The lock 8 is arranged in a lowered fashion in a recess 11 of the roof 5 —FIG. 1 —and comprises a first actuating element 12 and a second actuating element 13, which are of a plate-like design and combined into an assembly. The first actuating element 12 is surrounded by the second actuating element 13 and both actuating elements are aligned on their visible side 14 so as to be surface flush. The shape of the second actuating element 13 is rectangular, and a longer side SI of the latter is aligned transversely to the vehicle longitudinal direction D—D. The first actuating element 12 has a square shape and is of a different color or e.g. contains functional symbols and/or functional labeling. The actuating elements 12 and 13 are of such a design that only after operating the first actuating element 12 can the second actuating element 13 be moved from a closed position Sst into an open position Ost. The open position Ost of the second actuating element 13 is generated with a lifting motion Hb performed by the first actuating element 12 and a rotary motion Db performed by the second actuating element 13. In this context, locking member 9, which comprises a crank 15 with a locking pin 16, is connected torsion-resistant to the second actuating element 13 by means of a bearing shaft 17. The bearing shaft 17 is accommodated by two spaced bearing brackets 18 and 19, which are installed on a base plate 20 of the lock 8.

Figure 7:
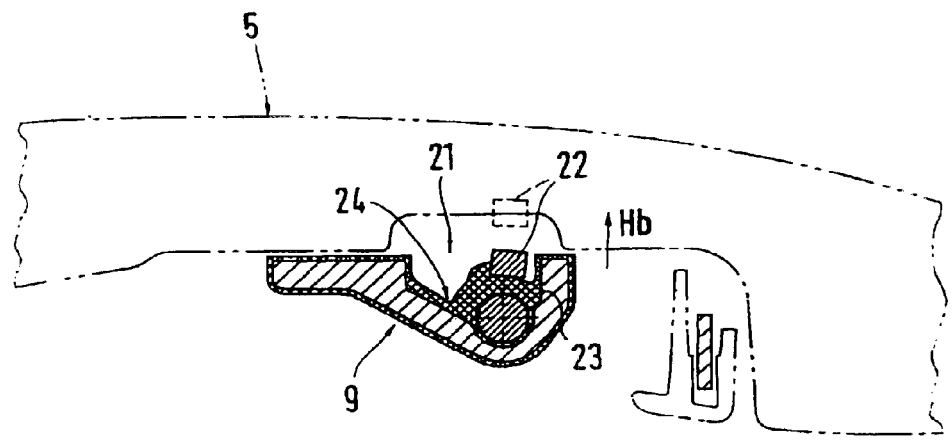
FIG. 7 is a sectional view along line VII—VII of FIG. 3.

A latching device 21 is provided between the first actuating element 12 and the base plate —FIGS. 3 and 7—, which is formed by a detent 22 of the first actuating element 12 and a first mounting 23. In the closed state Sst of the lock 8 or the first actuating element 12, the detent 22 rests in the first mounting 23. The vertical motion Hb of the first actuating element 12 disengages the detent 22 from the first mounting 23—FIG. 7, thus allowing the rotary motion Db to be performed with the second actuating element 13—FIG. 1. Additionally the latching apparatus 22 comprises a second mounting 24, which runs at an angle to the first mounting 23; the detent 22 rests in the second mounting 24 when the lock 8 is in the open position Ost.

Figure 8:
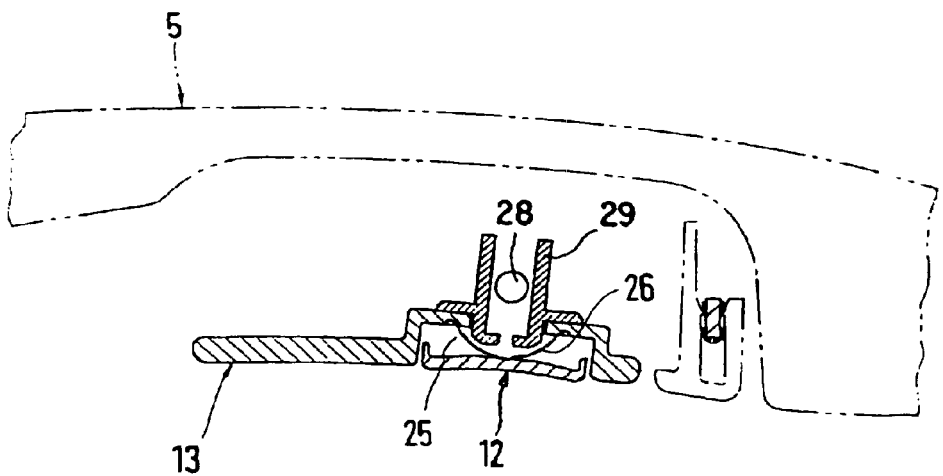
FIG. 8 is a sectional view along line IIX—IIX of FIG. 3.

FIG. 8 shows that the first actuating element 12 can be operated against the action of a spring element 25. The spring element 25 is a leaf spring 26, which is inserted between the first actuating element 12 and the second actuating element 13.

Figure 6:
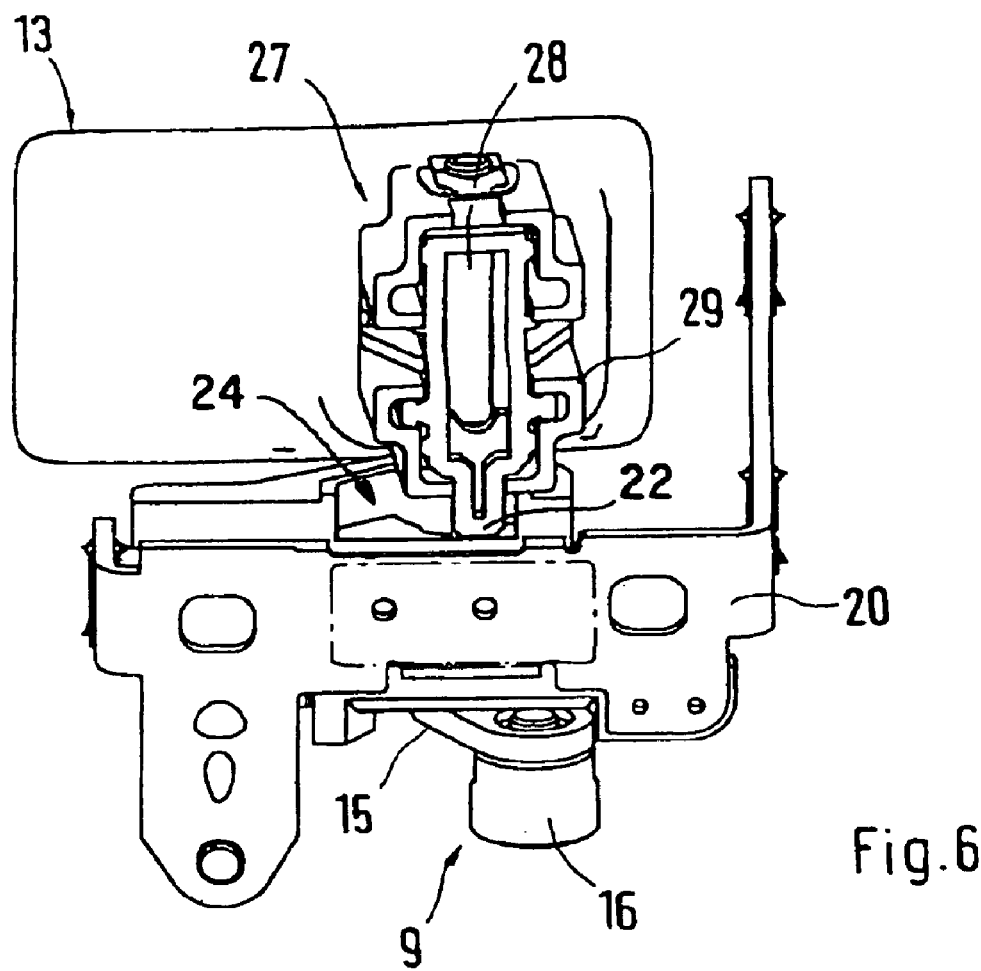
FIG. 6 is a view in the direction of the arrow C of FIG. 5.

The first actuating element 12 then and the second actuating element 13 work in conjunction with each other through a guide system 27 effecting the lifting motion Hb of the first actuating element. The guide system 27 is formed by a guide pin 28 of the first actuating element 12 and a guide track 29 of the second actuating element 13—Figs. 6 and 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A lock for a removable roof of a motor vehicle, comprising:
   a locking member by which the roof is held against a fixed structural part of a body of the motor vehicle,
   a first actuating element, and
   a second actuating element,
   wherein said first actuating element is surrounded by the second actuating element surface-flush, the actuating elements acting in conjunction with each other such that only upon operating the first actuating element can the second actuating element be moved from a closed position into an open position,
   wherein the open position is effected by a rectilinear motion of the first actuating element and a rotary motion of the second actuating element, and
   wherein the locking member of the lock is connected by way of a bearing shaft to the second actuating element.

2. The lock according to claim 1, wherein the bearing shaft is supported by bearing brackets of a base plate of the lock.

3. The lock according to claim 2, wherein a latching device formed by a detent of the first actuating element and a first mounting operates between the first actuating element and the base plate so that, in a closed position of the lock, the detent rests in the first mounting.

4. The lock according to claim 3, wherein the latching device comprises a second mounting, and wherein, in the open position, the detent of the first actuating element rests in the second mounting.

5. The lock according to claim 1, wherein the first actuating element can be actuated against the action of a spring element.

6. The lock according to claim 5, wherein the spring element is a leaf spring, which is inserted between the first actuating element and the second actuating element.

7. The lock according to claim 1, wherein the first actuating element and the second actuating element work in conjunction with each other by way of a guide system.

8. The lock according to claim 7, wherein the guide system is formed by a guide pin of the first actuating element and a guide track of the second actuating element.

9. The lock according to claim 1, wherein the first actuating element and the second actuating element have different colors on a visible side.

10. The lock according to claim 1, wherein at least the first actuating element contains at least one of functional symbols and functional labeling on a visible side.

11. The lock according to claim 1, wherein the fixed structural part is a rollover bar.

12. The lock according to claim 2, wherein the first actuating element can be actuated against the action of a spring element.

13. The lock according to claim 12, wherein the spring element is a leaf spring, which is inserted between the first actuating element and the second actuating element.

14. The lock according to claim 3, wherein the first actuating element can be actuated against the action of a spring element.

15. The lock according to claim 14, wherein the spring element is a leaf spring, which is inserted between the first actuating element and the second actuating element.

16. The lock according to claim 1, wherein the motor vehicle is a passenger car.

* * * * *